Sept. 11, 1923.

C. DI FAOLA 1,467,778

AUTOMATIC MACHINE FOR THE RAPID OR DIRECT PREPARATION OF COFFEE

Filed Aug. 27, 1921

Sept. 11, 1923.  
C. DI PAOLA  
1,467,778  
AUTOMATIC MACHINE FOR THE RAPID OR DIRECT PREPARATION OF COFFEE  
Filed Aug. 27, 1921  
6 Sheets-Sheet 2

Fig. 3.

Sept. 11, 1923. 1,467,778
C. DI PAOLA
AUTOMATIC MACHINE FOR THE RAPID OR DIRECT PREPARATION OF COFFEE
Filed Aug. 27, 1921 6 Sheets-Sheet 4

INVENTOR:
Camillo Di Paola
By Richards Geier
Attys.

Sept. 11, 1923.   1,467,778
C. DI PAOLA
AUTOMATIC MACHINE FOR THE RAPID OR DIRECT PREPARATION OF COFFEE
Filed Aug. 27, 1921   6 Sheets-Sheet 5

Inventor
Camillo Di Paola.
by Richards Geier
Attorneys.

Sept. 11, 1923. 1,467,778
C. DI PAOLA
AUTOMATIC MACHINE FOR THE RAPID OR DIRECT PREPARATION OF COFFEE
Filed Aug. 27, 1921 6 Sheets-Sheet 6

Patented Sept. 11, 1923.

1,467,778

UNITED STATES PATENT OFFICE.

CAMILLO DI PAOLA, OF ROME, ITALY.

AUTOMATIC MACHINE FOR THE RAPID OR DIRECT PREPARATION OF COFFEE.

Application filed August 27, 1921. Serial No. 495,849.

*To all whom it may concern:*

Be it known that I, CAMILLO DI PAOLA, foreman, a subject of the King of Italy, residing at Rome, in the Kingdom of Italy, have invented certain new and useful Improvements in Automatic Machines for the Rapid or Direct Preparation of Coffee, of which the following is a specification.

This invention has for its object an automatic machine for the preparation of freshly ground and percolated coffee for delivery into cups, one or more at a time according to the size of the machine.

The object of the invention is to provide a machine which will measure the predetermined quantity of coffee required each time, will grind it, will extract the coffee essence from the ground coffee by means of jets of steam and boiling water, will then withdraw the filter containing the coffee grounds and replace it with freshly filled filters.

All these operations are executed automatically by the machine according to the present invention, immediately after one or more counters or tokens have been introduced into a slot and a button or starting lever has been operated.

One of the features of the present invention resides in the fact that the various operations relating to the preparation of the coffee are effected simultaneously.

Figures 1, 2:
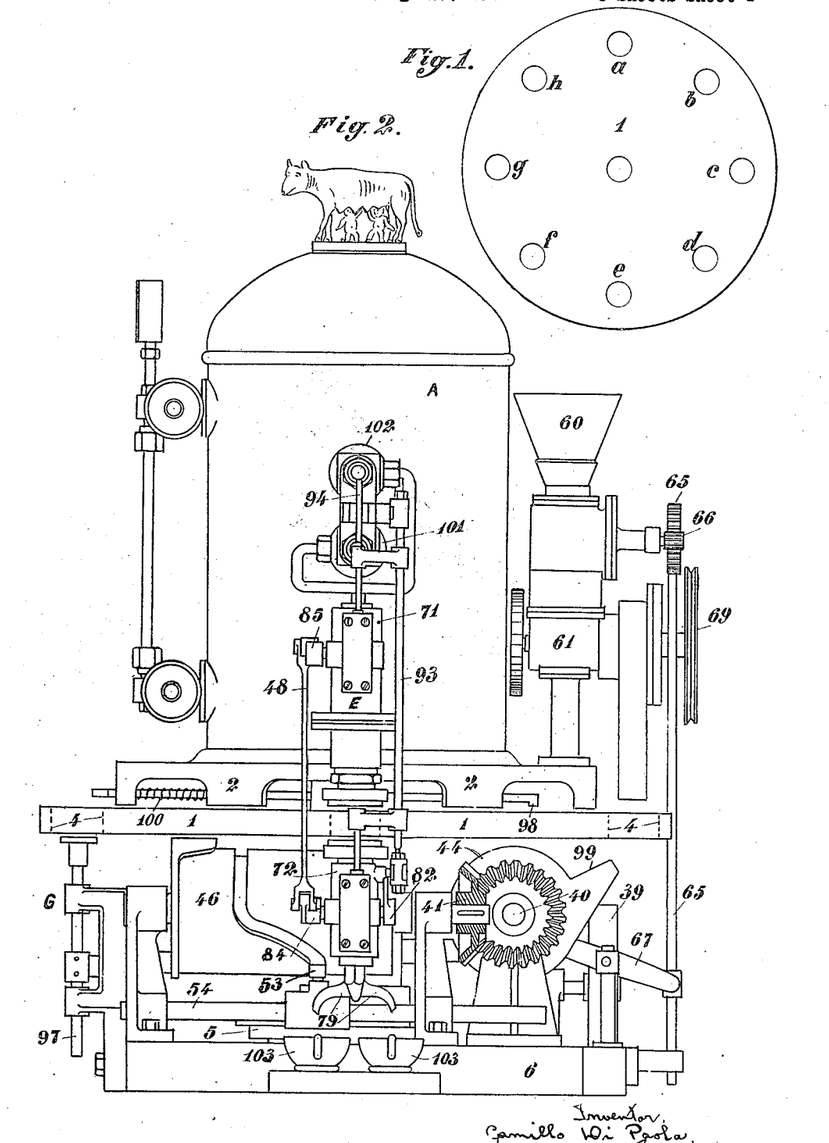
Fig. 1 is a diagram of the rotary platform.
Figs. 2 and 3 are a front and side elevation respectively of the machine.

For this purpose the machine is provided with a platform revolving about a vertical axis, shown diagrammatically in Fig. 1 of the accompanying drawings, near the periphery of which platform recesses or alveoles are formed placed at equal intervals and in which are located the filters or receptacles intended to contain the ground powder supplied by a feeding hopper.

The machine herein disclosed is shown as having eight filter receiving recesses in the revolving platform. The machine having been started in the manner which will hereinafter be described, the platform makes a portion of a revolution (⅛ of a revolution when the recesses are 8 in number) and then stops; at this moment the recess —*a*— of the platform contains a filter filled with coffee powder registering with the exhausting mechanism; recess —*h*— contains a filter which has been filled with coffee powder in a preceding operation of the machine, recess —*g*— contains a filter registering with the grinding mechanism, recess —*f*— contains an empty filter, recess —*e*— is registering with the mechanism delivering fresh filters, recess —*d*— is empty, recess —*c*— contains a filter registering with the expelling mechanism, recess —*b*— contains a filter filled with exhausted coffee powder. The operations of the mechanisms of the machine are effected simultaneously by driving means controlled by a small electric motor, said means consisting substantially of a system of levers provided with friction rollers adapted to travel in guide grooves cut in cams mounted on shafts driven simultaneously by the said small motor.

It is evident that with an automatic machine of this type the service staff is reduced to a minimum, hence there is a very considerable economy.

Referring to the accompanying drawings which illustrate diagrammatically a practical form of construction of the invention as applied to a machine which will supply two cups of coffee at a time.

On the drawing: A is a boiler of the usual type, provided with level indicators and other accessory members, not forming a part of this invention.

Figure 5:
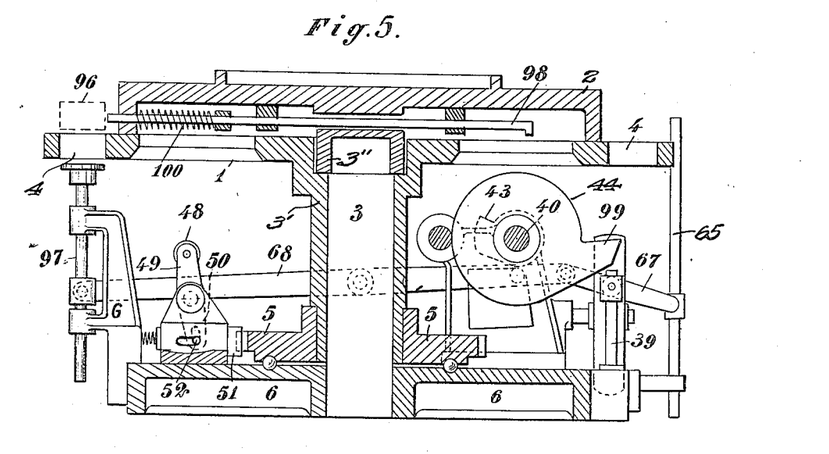

—6— is the pedestal which supports the whole apparatus; —3— is an upwardly extending pivot mounted on the pedestal and cased in a hollow piece 3' as shown in Fig. 5.

—2— is the boiler base which is provided with a hollow socket 3'' receiving the upper portion of pivot 3.

—1— is a platform connected to a notched revolving disc 5, said parts being both keyed upon the hollow member 3' and disc 5 bearing upon antifrictional balls interposed between its lower surface and the upper surface of pedestal 6.

Figures 6, 7:
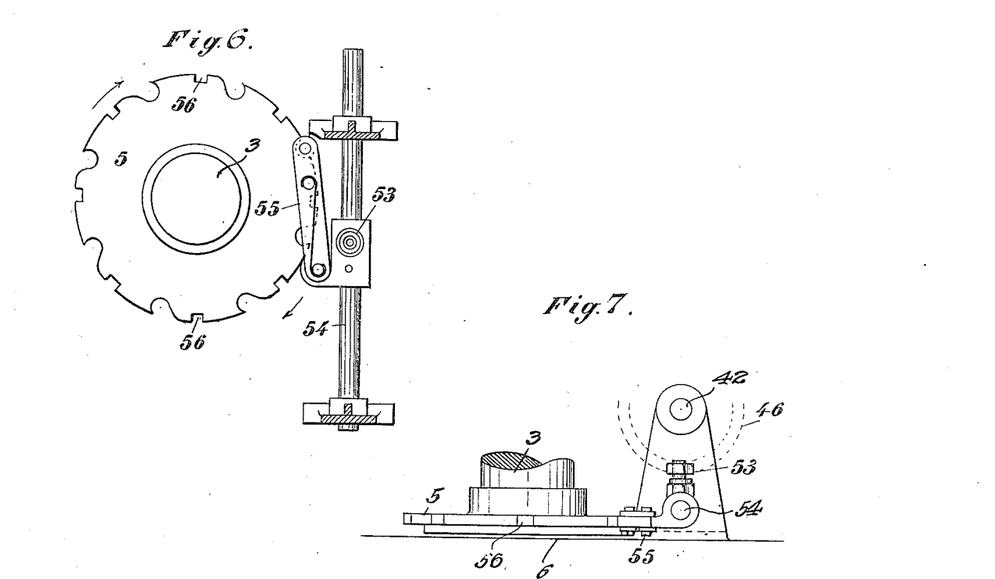
Figs. 6 and 7 are respectively a plan view and front elevation of the mechanism for the periodic progression of the rotary platform.
Figure 8:
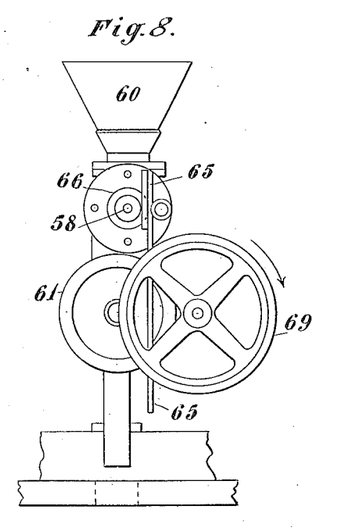
Fig. 8 is a side elevation of the charging and grinding mechanisms.
Figure 9:
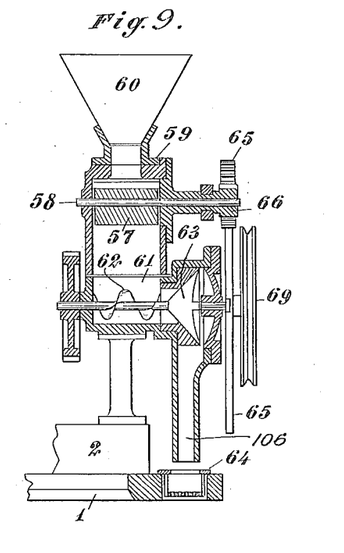
Fig. 9 is a central vertical section of Fig. 8.

A device is provided to cause a partial rotation of disc 5 together with platform —1— (Figs. 4, 5, 6, 7) and to hold the platform against movement upon completion of said partial revolution and comprises a rod 55 designed to engage one of the disc notches and a spring catch 51 of the disc. Rod 55 is connected to a shaft 54 controlled by a small roller 53 which is in driving relation with the main electric motor shaft 34. As may be seen from Fig. 6 the disc notches are so shaped that disc 5 is compelled to rotate one tooth clock-wise every time that shaft 54 moves in the direction shown by the arrow, while the tooth keyed on rod 55 rides freely upon the notches, without imparting any movement to disc 5, when shaft 54 moves in the opposite direction.

The spring catch 51 is controlled by a lever 50 (Fig. 5) through a small pin 52.

Both roller 53 and pin 52 are in driving relation with the electric motor driving shaft through means comprising cams so constructed and arranged as to allow the spring catch being withdrawn upon starting the electric motor, and to engage again the disc 5 upon its partial rotation.

Figure 10:
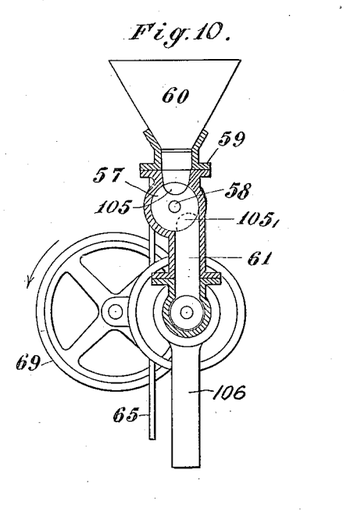
Fig. 10 is a central vertical section at right angles to the section of Fig. 9.
Figure 11:
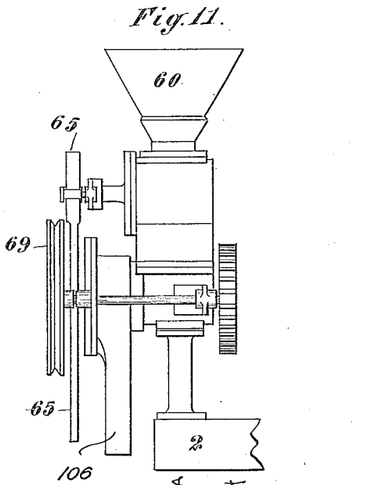
Fig. 11 is a front view of Fig. 8.

In order to automatically measure the coffee to be ground a charging device is provided comprising a revoluble cylinder 57 (Figs. 4, 8, 9, 10, 11) which constitutes the movable bottom of the hopper 60 containing the roasted coffee beans; a recess 105 being formed in the revoluble cylinder to contain a predetermined quantity of coffee discharged from the hopper. Said device also comprises means to turn the revoluble member 57 and recess 105, into position (shown by dotted lines in Fig. 10) to discharge the coffee beans into underlying mill 61 and to return member 57 in its initial position upon said coffee discharge being completed; said means consisting of a rack 65 gearing with pinion 66 keyed on the revoluble member shaft 58; an alternate vertical movement of rack 65 being produced through intermediate links by a cam 43, see Figs. 4 and 5, which is in driving relation with the electric motor shaft.

The grinding device to grind the coffee beans which fall into the mill 61, comprises a screw 62 which conveys the coffee beneath the teeth of a toothed cone 63, and a conduit to guide the powdered coffee into the filter 64 (g in Fig. 1). The screw 62 is driven from the motor by a grooved pulley 69 and suitable reducing means.

While the filter 64 is filled with ground coffee, another device is operated which exhausts the coffee powder filling the filter 70 (a in Fig. 1); means being provided for this purpose to supply a jet of water and steam into the filter, in combination with means to supply an hermetic closure around the filter; all of said means being controlled by a single cam 45 in driving relation with the motor shaft.

The device for the automatic operation of the boiler taps 101, 102 (Figs. 2, 3, 14, 15) which respectively supply a jet of water and a jet of steam through pipe 76, comprises a double armed rocking lever 94 and a lever 91 connected to each other by rod 93.

Figure 15:
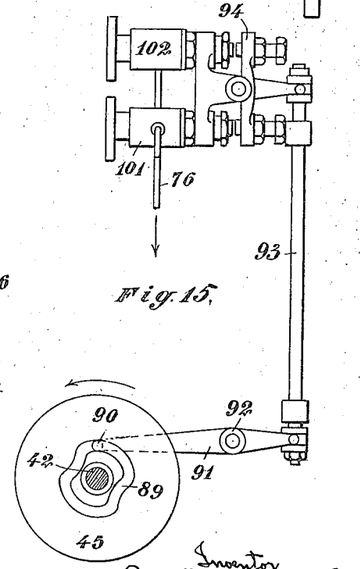

Lever 91 is pivotally mounted on pivot 92 and is provided with a roller 90 engaging with a cam groove 89 formed on the right hand face of cam member 45 mounted on shaft 42, this latter being in driving relation with the electric motor shaft. Roller 90 sliding in groove 89 causes lever 91 to oscillate about its pivot 92, the movement of said lever being transmitted through rod 93 to lever 94, which latter according to its position can close one, both, or none of the tap valves 101 and 102.

The track of groove 89 is such that after starting from the initial position shown in Fig. 15, the rod 93 is first raised and the lever 94 opens the steam tap 102; during the second stage of movement rod 93 is lowered and lever 94 closes the steam tap 102 and opens the water tap 101, the groove 89 being so shaped that this operation is somewhat longer than the first. During the third stage of movement the rod 92 is again raised; the water tap is closed and the steam tap again opened to produce a second jet of steam on the coffee infusion. By a fourth movement the lever 91 and the rod 93 return finally to their initial position in which the taps are both closed.

As above stated, cam 45 also controls a device intended to furnish, at the proper time, a hermetic closure around filter 70 (Figs. 12, 13) and to inject water and steam in this latter.

Figure 12:
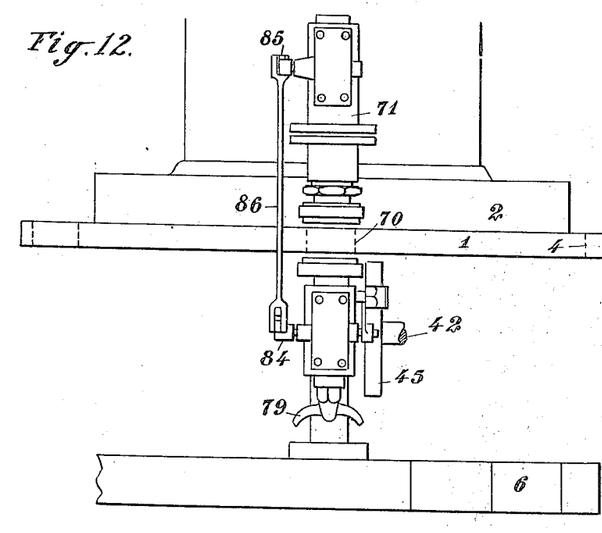
Figs. 12 and 13 are respectively a front elevation and side view of the mechanism for exhausting the ground coffee, said side view being partially in section.
Figure 13:
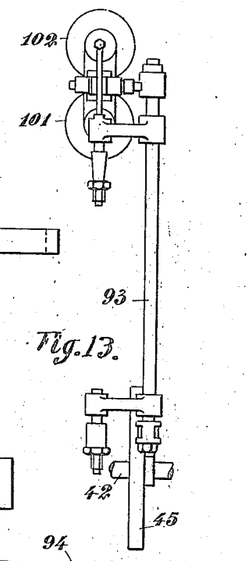
Figure 14:
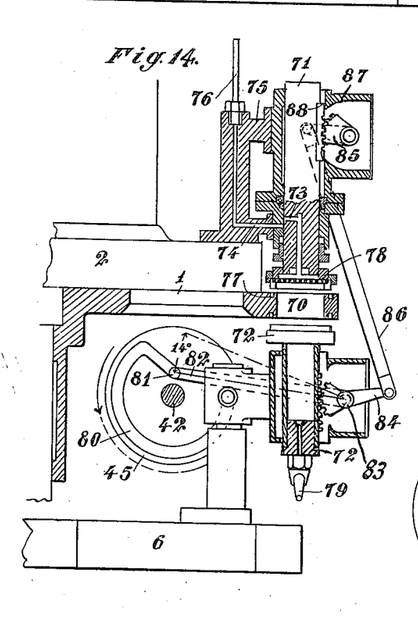
Figs. 14 and 15 are respectively a front elevation and side view of the arrangement for operating the taps supplying water and steam.

Said device comprises a pair of sliding cylinders 71 and 72 coupled in tandem, the upper cylinder 71 being hollow internally and provided with a conduit 73 allowing the passage of the water and steam contained in the conduit 74 formed in member 75 adjoining with said cylinder casing, which conduit 74 communicates by means of pipe 76 with the boiler taps.

A lever mechanism causes the simultaneous sliding of cylinder 71 downwards and of cylinder 72 upwards so as to compress the packings 77 of the platform recess which contains filter 70 and to form thus a hermetic joint for this latter. In this position the conduit 73 registers with the conduit 74, water and steam may be injected through the perforated plate 78 and through the coffee, the infusion passing through a small passage in the lower cylinder 72 communicating with spouts 79 which deliver the coffee to cups 103 (Fig. 3) placed beneath said spouts.

The lever mechanism controlling the movement of cylinders 71, 72 comprises a lever 82 pivotally mounted on pivot 83, two parallel levers 84 and 85 connected by link 86, and two toothed sectors 87 keyed on the shafts of these levers and designed to impart movement in the two opposite directions to cylinders 71 and 72.

Lever 82 is provided with a smaller roller 81 mounted thereon and engaging a groove 80 formed in the left face of the same cam 45 which controls the movement of taps 101 and 102, the track of groove 80 being such as to allow lever 82 to turn through an angle of about 14° around pivot 83 and then to return to its initial position shown in Fig. 15 by dotted lines.

It will be apparent that cylinders 71 and 72 will move away from each other when lever 82 raises the link 86 the same approaching each other when link 86 is lowered.

While filter $g$ (Fig. 1) is filled with coffee, and the coffee contained in filter $a$ is exhausted another device is operated to remove and eject filter (96 $c$ in Fig. 1) from the platform, said device consisting of a piston 97 (Fig. 5) and a spring piston 98 which are respectively controlled by the left arm of a double arm lever 68 and by a projection 99 of a cam 44 mounted on shaft 40.

The lever 68 is operated by a cam 43, keyed on the same shaft as the cam 44, said lever causing piston 97 to be raised in order to force out of slot 4 the filter 96 which is lodged therein containing exhausted coffee powder.

The filter 96 remains for a few moments thus raised, and is then pushed into a suitable receptacle under the action of the thrust caused by spring piston 98 in its turn is laterally pushed by said cam projection 99. As the rotation of cam 44 continues the projection 99 thereon no longer meets the piston 98 which latter under the action of spring 100 resumes the initial position shown in Fig. 5. At the same time the rotation of cam 43 causes the left arm of lever 68 to be lowered carrying thus piston 97 in its initial position.

The machine also comprises a device for automatically refilling fresh filters in the empty recesses of the revolving platform —1—, said device consisting of a plurality of vertical guides 104 (Fig. 3) between which a pile of super-imposed empty filters is contained, the lowest of which contacts against the upper face of the platform 1 in alignment with the recesses 4 and falls in one of the platform recesses when this latter becomes into alignment with the pile.

The machine is started by a token mechanism which does not form a part of this invention.

By introducing one or two tokens in the token mechanism, an electric circuit is closed which feeds a small electric motor not shown on the drawings; a disc mounted on the motor shaft is then caused to revolve and, after having performed a complete rotation, said disc causes the electric circuit to break and the motor to stop.

Figure 3:
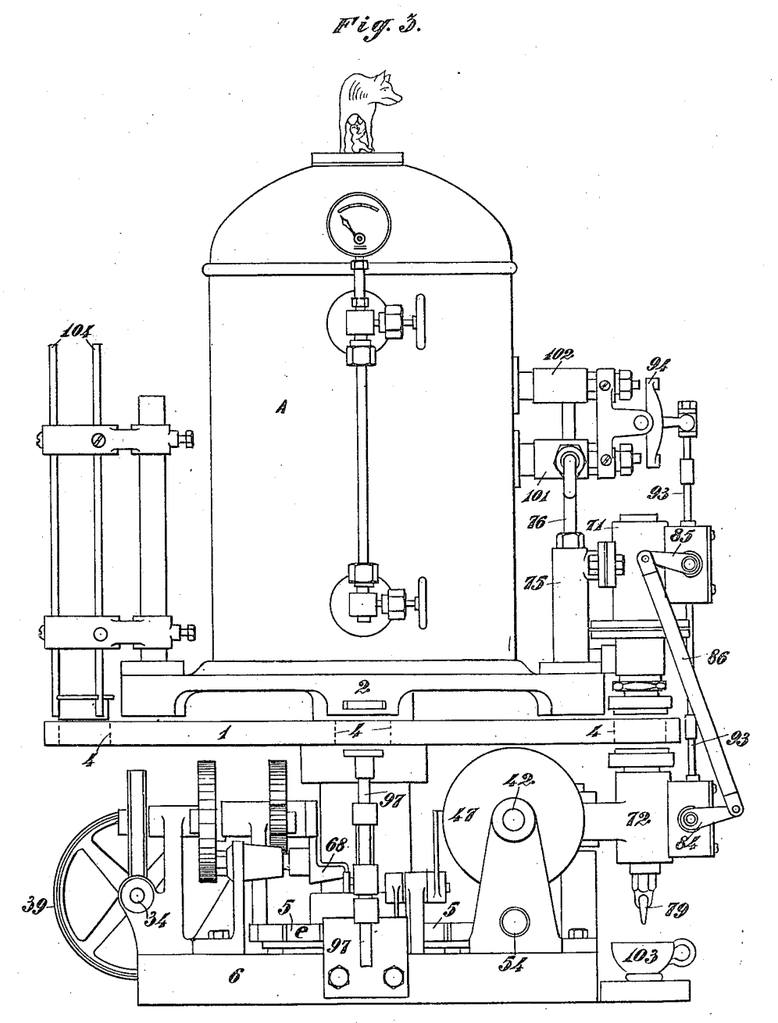

The means for transmitting the movement of the driving motor shaft to the various parts constituting the machine are comprised in the space between the pedestal 6 and the platform —1— (Figs. 2, 3).

Figure 4:
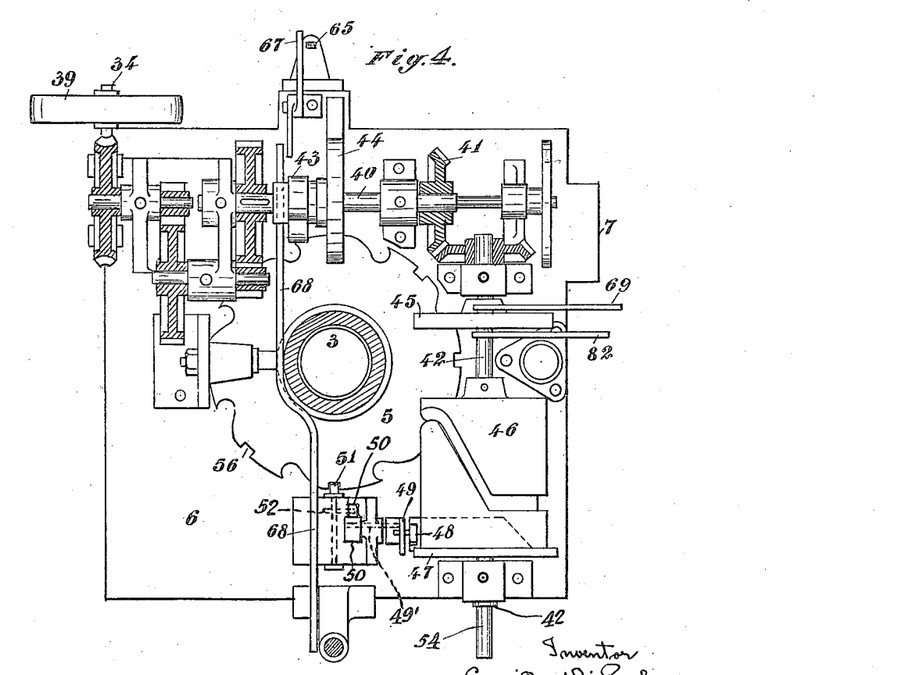
Figs. 4 and 5 are respectively a plan view and front elevation of the parts for transmitting the movement to the various mechanisms.

The driving relations are shown in Fig. 4, where 34 denotes the shaft of the driving motor; 39 is a pulley by means of which the drive is transmitted from shaft 34 through intermediate reducing gears to the shaft 40 whose drive in turn is transmitted by means of a pair of bevel gears 41 to the shaft 42 which is at right angle to shaft 40.

The various parts of the machine are actuated by levers provided with friction rollers which travel in the grooves of cams 43, 44 keyed on the shaft 40 and in the grooves of cams 45, 46, 47 keyed on shaft 42.

The operation of the machine commences by rotating through $\frac{1}{8}$th of circumference the revolving platform 1 with the object of subjecting freshly filled filter —$a$— and $e$ to the jets of water and steam, of ejecting the filters $c$ (Fig. 1) which are assumed to be exhausted, of supplying empty filters $e$ and filling filters $g$ with freshly ground coffee, the platform being moved by means of the notched disc 5 as hereinbefore described. At the commencement of movement a roller 48 mounted on lever 49 and sliding in the groove of cam 47 causes the movement of a lever 50 (Figs. 4, 5) which is rigidly connected to the lever 49 by means of the pin 49' and owing to this movement the slider or spring detent 51 is drawn back by the pin 52 and disc 5 remains free to move. At the same time a roller 53 mounted on the shaft 54 (Figs. 2, 3, 6, 7) and engaging in the groove of cam 46 controls the movement of the shaft 54 and the rod 55 connected therewith, the extent of the movement being just sufficient to turn the platform 1$\frac{1}{8}$th of a revolution only and the throw of the cam 47 being so proportioned that upon completion of said partial revolution spring slider 51 is no longer retained by lever 50 and enters one of the notches 56 thus causing disc 5 to be held against movement.

At this time the other cams 43, 44, 45 become operative to actuate the various devices as it will be hereinafter described.

The rotation of the shaft 58 of the distributor is caused by the alternate longitudinal movement of rack 65 (Figs. 4, 5, 8, 9, 10, 11) gearing with pinion 66 keyed on the shaft 58, said rack being moved through a balance arm 67 pivotally connected to the lever 68 (Fig. 5) which latter is controlled by the cam 43 mounted upon the operating shaft 40.

The rotation of the mill screw 62, to grind the coffee emitted from the distributor into the mill 61 is caused by the grooved pulley 69 connected through reducing gearing with shaft 42, said rotation continuing all the time the machine operates.

The device for exhausting the ground coffee contained in filter 70 is controlled by the double faced cam 45 mounted upon shaft 42, said cam being provided with a groove 89 on its right hand face to control the valves of water tap 101 and steam tap 102, whilst its left hand face is provided with a groove 80 to control the movement of cylinders 71 and 72 designed to hermetically close said filter 70.

The track of said grooves is such as to allow of the injection of water and steam through the upper cylinder 71 when this latter is lowered and bears against the filter, and to close the valve taps when cylinder 71 is brought again in its upper initial position.

The machine shown in the drawing is designed to serve simultaneously two cups of coffee, the discharging spouts for the infusion being two and the dimensions of the distributing grooves being such as to distribute the coffee wanted for two cups.

Whilst a filter is filled with coffee and another filter is supplying the coffee infusion a third filter containing exhausted powder coffee is ejected from the platform by means of a vertical pushing and a horizontal pushing respectively exerted by piston 97 and spring piston 98; these latter being respectively controlled by cam 43 and by a projection 99 of cam 44 keyed on the same shaft as cam 43.

With particular reference to Fig. 5, it will be seen that cam 43 controls the double armed lever 68, one arm of which drives rack 65, the other arm causing the alternate movement of piston 97.

Cams 43 and 44 are so shaped as to cause spring piston 100 to be laterally pushed against the filter to be ejected just a few moments after said filter has been raised by piston 97.

It will be seen that the machine according with this invention is adapted to serve freshly ground and prepared coffee with the greatest celerity, because whilst it is exhausting the ground coffee intended for the consumer who has inserted the special coin or token into the slot in the case which contains the motor apparatus, it is providing for the refilling of the filter for the service of a succeeding customer.

In order to prevent fraud the tokens may be of any suitable special form which will permit of their insertion in the slot and they may be of a given length and weight in order that the small electric motor may be actuated by them. The machines may be constructed of any suitable range, in other words they may be adapted to serve simultaneously one or more cups of coffee.

The variation in the range of the machine involves simply the variation of the dimensions of the distributing groove, of the number of filters, and the number of discharging spouts for the infusion and the other parts of the various mechanism.

Having thus described my invention, what I claim as new and desire to secure by Letters Patent, is:

1. In an automatic coffee dispensing machine, a revolving platform adapted to carry a plurality of filters secured upon a vertical shaft, means for grinding the coffee and discharging it to a filter, means for discharging steam and water into a filter which has been filled with ground coffee, means for removing from said platform a filter from which the coffee infusion has been extracted, means for supplying empty filters to the revolving platform, a plurality of cams adapted to operate simultaneously all of the above mentioned means and an electric motor to drive said cams.

2. An automatic coffee dispensing machine as set forth in claim 1 in which a disc provided with a plurality of notches is keyed upon said vertical shaft, means adapted to engage said notches and cause a partial revolution of said platform and a spring catch adapted to engage one of said notches upon completion of said partial revolution and hold said platform against movement.

3. An automatic coffee making machine as set forth in claim 2 in combination with a driving shaft in driving relation with said electric motor and means comprising a cam on said shaft to withdraw said spring catch upon starting the electric motor, said cam constructed and arranged to allow said spring catch to engage said notched discs and hold said platform stationary upon completion of its partial revolution.

4. An automatic coffee dispensing machine as set forth in claim 1, in combination with means for causing the platform to perform a fraction of a revolution on starting the motor, means for stopping the platform after said rotation, and a charging mechanism which automatically measures the coffee to be ground, said mechanism comprising a revoluble member which constitutes the movable bottom of a feed hopper, a recess formed in the revoluble member adapted to contain a predetermined quantity of coffee discharged from the hopper, and means to turn the revoluble member into position to discharge the coffee beans into said grinding mechanism.

5. An automatic coffee dispensing machine as set forth in claim 1, in combination with means for causing the platform to perform a fraction of a revolution upon the motor being started, means for stopping the platform after said rotation and a charging mechanism which automatically measures the coffee to be ground, said mechanism comprising a revoluble member having a recess to contain a predetermined quantity of coffee, means to turn the revoluble member into position to discharge the coffee berries into said grinding means, said means comprising a cam keyed on a shaft driven by the electric motor, which cam remains inoperative until the revolving platform after having performed its revolution stops and thereby brings an empty filter in alignment with the discharge outlet of said grinding means.

6. An automatic coffee dispensing machine as set forth in claim 1 in combination with means for causing the platform to perform a partial revolution, and means for stopping the platform after said partial revolution, said means for discharging the steam and water comprising a pair of vertically aligned upper and lower cylinders, means comprising a cam to cause said cylinders to move simultaneously toward a filter containing ground coffee on said platform, and packing means to hermetically seal said cylinders in contact with said last mentioned filter.

7. An automatic coffee dispensing machine as set forth in claim 6 in combination with a charging mechanism for measuring a predetermined quantity of coffee and delivering it to said grinding means, a conduit for conveying steam and water to said upper cylinder, said upper cylinder provided with a conduit adapted to register with said first named conduit when said upper cylinder is lowered and to eject the steam and water through the ground coffee in the filter from which the coffee infusion passes to the interior of the lower cylinder, and said lower cylinder being provided with spouts which are adapted to deliver the coffee to cups placed beneath said spouts.

8. A coffee dispensing machine as set forth in claim 1 in which said means for discharging the steam and water through the filter containing the ground coffee comprises a pair of vertically movable cylinders, a cam provided with cam grooves on its opposite faces, means connected with one of said grooves to cause said cylinders to approach each other, a steam tap, a water tap and means connected with the other groove to control said taps, said cam grooves being constructed and arranged to open said steam tap during the first part of the movement of said cylinders, to close said steam tap and open said water tap during a second part of said movement, to open said steam tap again during a third stage and to finally close both of said taps during the fourth and final stage of said movement.

9. In a coffee dispensing machine as set forth in claim 1 in combination with means for measuring a predetermined quantity of coffee and delivering it to said grinding means, said filter removing means comprising a rod for ejecting a filter from the platform, a spring piston for removing said filter laterally from said platform, means for actuating said rod and means for actuating said spring piston.

10. A coffee dispensing machine as set forth in claim 1 in which the means for supplying the empty filters to the revolving platform comprises a plurality of vertical guides between which a pile of superposed filters is contained, said guides being in alignment with and adapted to deliver an empty filter to the filter containing recesses in said platform.

11. An automatic coffee dispensing apparatus comprising a revolving platform provided with a plurality of spaced filter receiving recesses, means to feed a filter to said recesses, means for grinding the coffee and discharging it to a filter, means for discharging steam and water into a filter which has been filled with coffee, means for removing from said platform a filter from which the coffee infusion has been extracted, means for normally retaining said platform with filter receiving recesses in alignment with each of the aforementioned means, means for imparting a partial revolution to said platform equal to the spaces between said recesses and means for automatically operating all of said means.

In testimony whereof I have signed this specification in the presence of two subscribing witnesses, in the city of Rome, Italy, this 20th day of July, 1921.

CAMILLO DI PAOLA.

Witnesses:
ANTONIO SABOCCITTA,
WILLIAM SCHMID.